United States Patent [19]

Komohara

[11] Patent Number: 4,722,573

[45] Date of Patent: Feb. 2, 1988

[54] SEAT BELT-EQUIPPED SEAT ASSEMBLY

[75] Inventor: Minoru Komohara, Gifu, Japan

[73] Assignee: Ikeda Bussan Co., Ltd., Ayase, Japan

[21] Appl. No.: 910,685

[22] Filed: Sep. 23, 1986

[30] Foreign Application Priority Data

Sep. 30, 1985 [JP] Japan .................. 60-149790[U]

[51] Int. Cl.$^4$ ................. B60N 1/08; A47D 15/00
[52] U.S. Cl. ..................... 297/468; 248/429; 280/801
[58] Field of Search ............ 297/468, 473; 280/801; 248/393, 429, 430

[56] References Cited

U.S. PATENT DOCUMENTS 4,072,347 2/1978 Boisset .................. 297/468

FOREIGN PATENT DOCUMENTS 3018811 11/1981 Fed. Rep. of Germany ...... 297/473
3226932 1/1984 Fed. Rep. of Germany ...... 297/473

Primary Examiner—James T. McCall
Attorney, Agent, or Firm—Schwartz, Jeffery, Schwaab, Mack, Blumenthal & Evans

[57] ABSTRACT

Two brackets are secured at their upper ends to side frames of a seat cushion part of a seat. Each bracket has at its lower end a first engaging portion which interlocks with a second engaging portion which is defined by either one of the vehicle floor and a structure which is disposed between the seat cushion part and the vehicle floor. The interlocking is so made as to permit sliding movement of the first engaging portion relative to the second engaging portion.

12 Claims, 5 Drawing Figures

SEAT BELT-EQUIPPED SEAT ASSEMBLY

BACKGROUND OF THE INVENTION

1. Field of the Invention

The present invention relates in general to a seat assembly for a motor vehicle, and more particularly to a seat assembly equipped with a seat belt.

2. Description of the Prior Art

In order to clarify the task of the present invention, one conventional seat belt-equipped seat assembly will be outlined with reference to FIG. 5 of the accompanying drawings, which is generally designated by numeral 1.

The seat assembly 1 comprises a seat cushion part 2 and a seat back part 3. A known reclining mechanism is arranged between the parts 2 and 3 to allow a tilting movement of the seat back part 3 relative to the seat cushion part 2. Parallel upper rails 5a and 5b are secured to lower side frames 4a and 4b of the seat cushion part 2. The upper rails 5a and 5b are slidably disposed on parallel lower rails 6a and 6b which, in turn, are secured to rectangular rotatable frame 7. Although not shown in the drawing, a known position lock device is arranged between the upper and lower rails to lock the upper rails at a desired position relative to the lower rails. The rotatable frame 7 is rotatably disposed on a support member 8 which is stationarily mounted on a vehicle floor 9. As will be understood from FIG. 3, the rectangular rotatable frame 7 is formed at its depressed center portion with a circular opening 71. The peripheral edge 72 of the circular opening 71 is slidably disposed in a circular groove 82 formed on an upper raised portion of the support member 8. Designated by numeral 81 a circular opening formed in the raised center portion of the support member 8, about which is defined the circular groove 82. Because of the rotatable connection of the rotatable frame 7 to the support member 8, the seat proper, more particularly, the parts supported by the rotatable frame 7 are horizontally rotatable relative to the vehicle floor 9. Furthermore, because of the sliding connection of the upper rails 5a to the lower rails 6a, the seat proper, more particularly, the parts supported by the upper rails 5a are horizontally and linearly movable relative to the vehicle floor 9.

The seat assembly 1 is equipped with a seat belt assembly, more particularly, a lap belt assembly which comprises a buckle member 10a fixed to a first belt portion 10c and a tongue member 10b fixed to a second belt portion 10d. The first and second belt portions 10c and 10d are connected to the lower side frames 4a and 4b of the seat cushion part 2 through respective retainers 11a and 11b.

However, hitherto, the connection of the seat belt assembly to the seat assembly has been given little thought. In fact, as is described herein above, such connection has been made by using only the retainers 11a and 11b fixed to the lower side frames 4a and 4b of the seat cushion part 2. Thus, upon application of big shock to the seat belt assembly by a seated passenger due to, for example, sudden braking of the vehicle, a big load is entirely applied on the retainers 11a and 11b. This induces sometimes deformation and/or breakage of the frames 4a and 4b of the seat cushion part 2 because the durability of these frames to such shock is usually poor.

SUMMARY OF THE INVENTION

It is therefore an object of the present invention to provide an improved seat belt-equipped seat assembly which is free of the above-mentioned drawback.

According to the present invention, there is provided a seat belt-equipped seat assembly mounted on a vehicle floor, the seat assembly comprising a seat proper including a seat cushion part and a seat back part, a structure mounted on the vehicle floor, a seat sliding mechanism including a pair of upper rails secured to the seat cushion and a pair of lower rails secured to the structure, the upper rails being slidably disposed on the lower rails so that the seat proper is slidable relative to the vehicle floor, a seat belt having ends which are respectively connected to side frames of the seat cushion part through respective retainers, two brackets respectively connected at their upper ends to the retainers, each bracket having a lower end formed into a first engaging portion, and a second engaging portion defined by either one of the structure and the vehicle floor, the first and second engaging portions interlocking with each other in such a manner that the first engaging portion is slidable with respect to the second engaging portion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
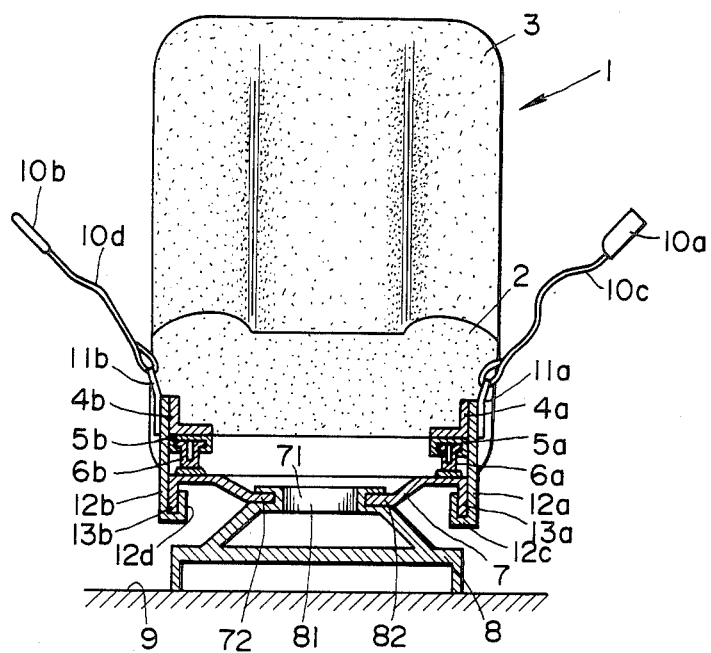
FIG. 1 is a sectional view of a seat belt-equipped seat assembly of a first embodiment of the present invention, which view is taken from a front of the seat assembly.
Figure 2:
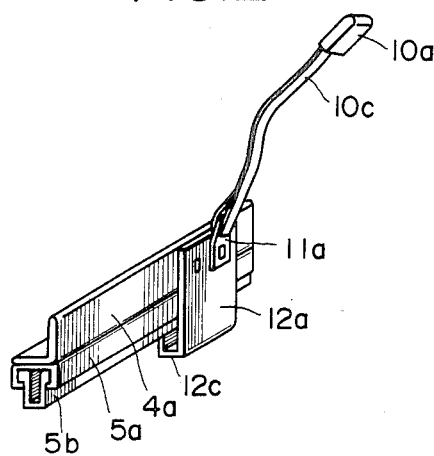
FIG. 2 is a perspective view of an arrangement employed in the seat assembly of the first embodiment of FIG. 1.
Figure 3:
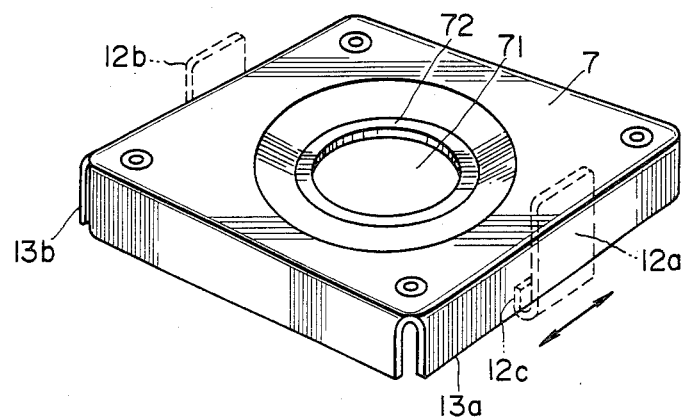
FIG. 3 is a perspective view of a rotatable frame employed in the seat assembly of FIG. 1 for horizontally turning the seat proper relative to a vehicle floor.
Figure 5:
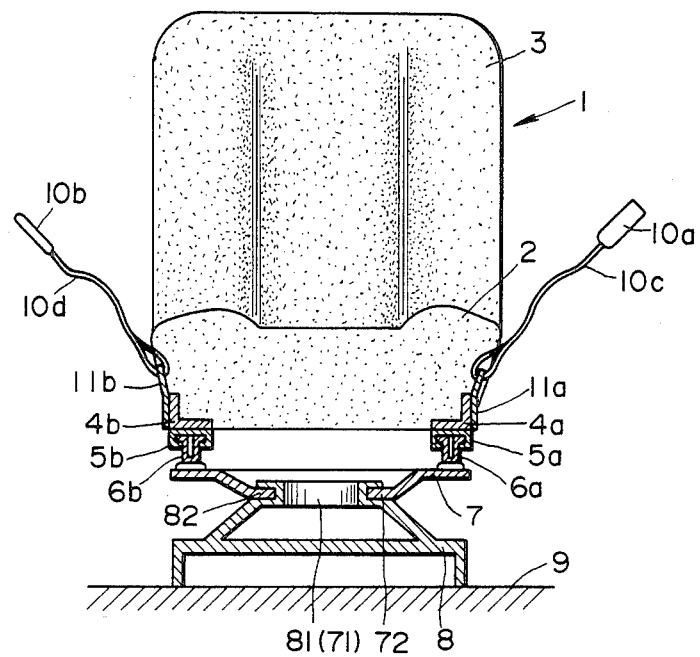
FIG. 5 is a view similar to FIG. 1, but showing a conventional seat belt-equipped seat assembly.

Referring to FIGS. 1 to 3, there is shown a seat assembly of a first embodiment of the present invention. As will be seen from FIG. 1, the seat assembly 1 of this embodiment is provided by modifying the conventional seat assembly of FIG. 5. Thus, substantially the same parts as those of the conventional seat assembly are designated by the same numerals and detailed explanation of them will be omitted from the following description.

The seat assembly 1 comprises a seat cushion part 2 and a seat back part 3 between which a known reclining mechanism is arranged. Parallel upper rails 5a and 5b are secured to lower side frames 4a and 4b of the seat cushion part 2, which are slidably disposed on parallel lower rails 6a and 6b secured to a rectangular rotatable frame 7. The rotatable frame 7 is rotatably disposed on a support member 8 through the afore-mentioned turning connection. The support member 8 is stationarily mounted on a vehicle floor 9. Thus, similar to the conventional seat assembly of FIG. 5, the seat proper is horizontally rotatable and horizontally linearly movable relative to the vehicle floor 9.

In this embodiment, the seat belt assembly is mounted to the seat assembly 1 in such a manner as will be described in the following.

That is, as will be seen from FIGS. 1 and 3, the rectangular rotatable frame 7 is formed at the laterally opposed sides with downwardly extending flanges 13a and 13b which act as guide rails as will be apparent as the description proceeds. As will be seen from FIGS. 1 and 2, the connection of the seat belt retainers 11a and 11b to the lower side frames 4a and 4b of the seat cushion part 4 is made through enlarged brackets 12a and 12b each being bolted to the corresponding lower side frame 4a or 4b. As is seen from FIG. 2, the belt retainer 11a or 11b is pivotally connected to the bracket 12a or 12b through one of the bolts. Each bracket 12a or 12b has a channel-shaped lower portion 12c or 12d into which the flange 13a or 13b of the rotatable frame 7 is slidably received. Thus, during the linear movement of the seat proper relative to vehicle floor 9, the brackets 12a and 12b move along the flanges 13a and 13b with the channel-shaped lower portions 12c and 12d kept interlocked with the flanges.

Upon application of big shock to the seat belt assembly, the load is transmitted or dispersed to not only the lower side frames 4a and 4b of the seat cushion part 2 but also the seat turning mechanism, unlike the case of the afore-mentioned conventional seat assembly. Thus, deformation and/or breakage of the side frames 4a and 4b does not occur.

Figure 4:
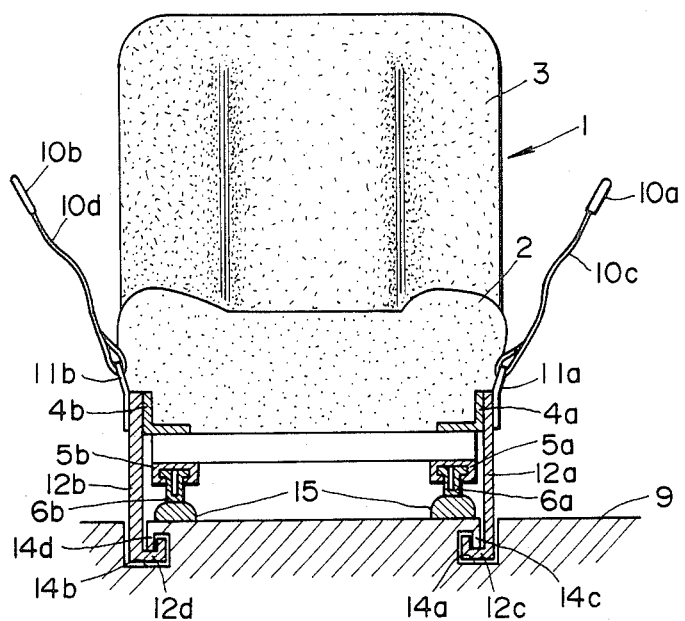
FIG. 4 is a view similar to FIG. 1, but showing a second embodiment of the present invention.

Referring to FIG. 4, there is shown a seat assembly of a second embodiment of the present invention.

The seat assembly 1 of the second embodiment comprises a seat cushion part 2 and a seat back part 3 between which a known reclining mechanism is arranged. Parallel upper rails 5a and 5b are connected through cross beams (no numerals) to lower side frames 4a and 4b of the seat cushion part 2. The upper rails 5a and 5b are slidably disposed on parallel lower rails 6a and 6b which are secured to the vehicle floor 9 through mounts 15. With this, the seat proper is horizontally linearly movable relative to the vehicle floor 9.

In this second embodiment, the connection of the seat belt retainers 11a and 11b to the lower side frames 4a and 4b of the seat cushion part 4 is made through elongate brackets 12a and 12b each being secured to the corresponding lower side frame 4a or 4b. Similar to the first embodiment, the belt retainer 11a or 11b is pivotally connected to the bracket 12a or 12b. The brackets 12a and 12b have channel-shaped lower portions 12c and 12d which are slidably received in respective grooves 14a and 14b formed in the vehicle floor 9. The grooves 14a and 14b have longitudinally extending flanges 14c and 14d which are put in the channels of the corresponding brackets 12a and 12b. Thus, during movement of the seat proper relative to the vehicle floor 9, the brackets 12a and 12b move together therewith with the channel-shaped lower portions 12c and 12d kept interlocked with the flanges 14c and 14d of the grooves 14a and 14b.

Upon applicatron of big shock to the seat belt assembly, the load is transmitted or dispersed to not only the lower side frames 4a and 4b of the seat cushion part 2 but also the vehicle floor 9. Thus, the undesired deformation and/or breakage of the side frames 4a and 4b does not occur.

What is claimed is:

1. A seat belt-equipped seat assembly mounted on a vehicle floor, said seat assembly comprising:

a seat proper including a seat cushion part and a seat back part;
a structure mounted on said vehicle floor;
a seat sliding mechanism including a pair of upper rails secured to said seat cushion and a pair of lower rails secured to said structure, said upper rails being slidably disposed to said structure, said upper rails being slidably disposed on said lower rails so that said seat proper is slidable releative to said vehicle floor;
a seat belt having ends which are respectively connected to side frames of said seat cushion part through respective retainers;
two brackets respectively connected at their upper ends to said retainers, each bracket having a lower end formed into a first engaging portion; and
a second engaging portion separate from said lower rails, said second engaging portion defined by one of said structure and said vehicle floor;
said first and second engaging portions interlocking with each other in such a manner that said first engaging portion is slidable with respect to said second engaging portion.

2. A seat belt-equipped seat assembly as claimed in claim 1, in which said first engaging portion is formed to have a channel and in which said second engaging portion is formed to have an elongate member, said elongate member being received in said channel while permitting sliding movement of the channel-shaped first engaging portion relative to said elongate member.

3. A seat belt-equipped seat assembly as claimed in claim 2, in which said channel is open at its upper portion and in which said elongate member extends substantially parallel with said vehicle floor.

4. A seat belt-equipped seat assembly as claimed in claim 3, in which said elongate member is a part of said structure.

5. A seat belt-equipped seat assembly as claimed in claim 4, in which said structure is a seat turning device which comprises:

a support member stationarily mounted on said vehicle floor; and
a rotatable member rotatably supported on said support member and mounting thereon said lower rails, said rotatable member having a downwardly extending flange which acts as said elongate member.

6. A seat belt-equipped seat assembly as claimed in claim 3, in which said elongate member is a horizontally extending flange which is formed in a groove formed in said vehicle floor.

7. A seat belt-equipped seat assembly as claimed in claim 1, in which each retainer is pivotally connected to the corresponding bracket.

8. A seat belt-equipped seat assembly mounted on a vehicle floor, said seat assembly comprising:

a seat proper including a seat cushion part and a seatback part;
a seat turning device mounted on said vehicle floor, said seat turning device including a support member stationarily mounted on said vehicle floor and a rotatable member rotatably supported on said support member;
a seat sliding mechanism including a pair of upper rails secured to said seat cushion part and a pair of lower rails secured to said rotatable member of the seat turning device, said upper rails being axially slidably engaged with said lower rails so that said seat proper is slidably movable relative to said seat turning device and thus to the vehicle floor;

a seat belt having both ends which are respectively connected to side frames of said seat cushion part through respective retainers;

two brackets respectively secured at their upper ends to said retainers, each bracket having a lower end formed into a first engaging portion; and a second engaging portion defined by each side portion of said rotatable member of the seat turning device, said first and second engaging portions being slidably interlocked with each other in such a manner that the first engaging portion is slidable with respect to the second engaging portion.

9. A seat belt-equipped seat assembly as claimed in claim 8, in which said first engaging portion is formed to have a channel and in which said second engaging portion is formed to have an elongate member, said elongate member being received in said channel while permitting sliding movement of the channel-shaped first engaging portion relative to said elongate member, said channel being open at its upper portion and said elongate member extending substantially parallel with the vehicle floor.

10. A seat belt-equipped seat assembly as claimed in claim 9, in which said elongate member is a downwardly extending flange integrally formed on said rotatable member on the seat turning device.

11. A seat belt-equipped seat assembly mounted on a vehicle floor, said seat assembly comprising;

a seat proper including a seat cushion part and a seat-back part;

a rigid structure mounted on said vehicle floor;

a seat sliding mechanism including a pair of upper rails secured to said seat cushion part and a pair of lower rails secured to said rigid structure, said upper rails being axially slidably engaged with said lower rails so that said seat proper is slidablyl movable relative to said vehicle floor;

a seat belt having both ends which are respectively connected to side frames of said seat cushion part through respective retainers;

two brackets respectively secured at their upper ends to said retainers, each bracket having a lower end formed into a first engaging portion; and a second engaging portion defined by each of spaced portions of said vehicle floor, said first and second engaging portions being slidably interlocked with each other in such a manner that the first engaging portion is slidable with respect to the second engaging portion.

12. A seat belt-equipped seat assembly as claimed in claim 11, in which said first engaging portion is formed to have a channel and in which said second engaging portion is a horizontally extending flange portion which is formed in a groove formed in said vehicle floor, said horizontally extending flange being received in said channel while permitting sliding movement of the channel-shaped first engaging portion relative to said flange, said channel being open at its upper portion.

* * * * *